K. KLUGE.
BAKING MACHINE.
APPLICATION FILED MAY 8, 1915.
1,152,184.
Patented Aug. 31, 1915.
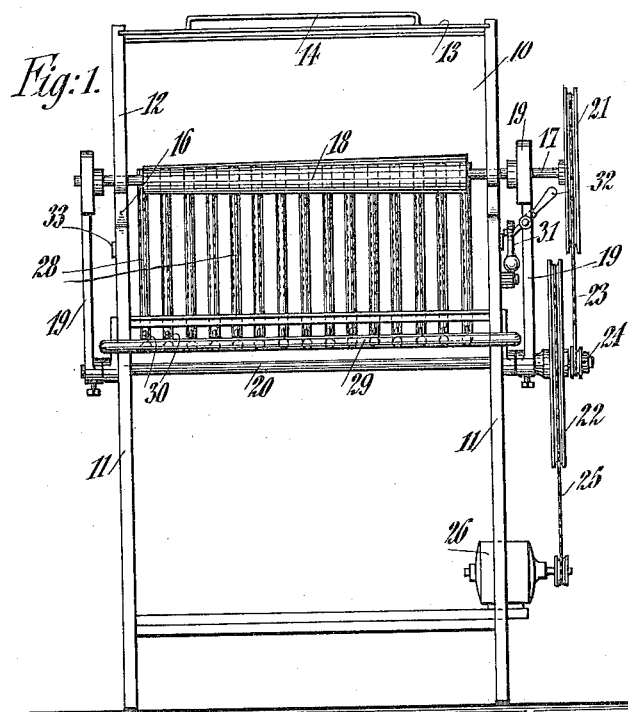
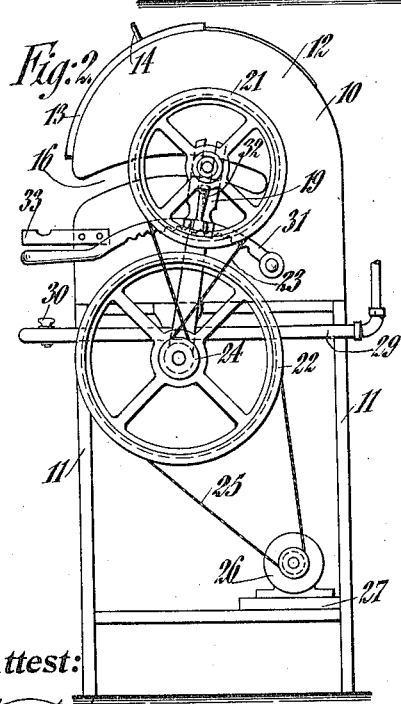
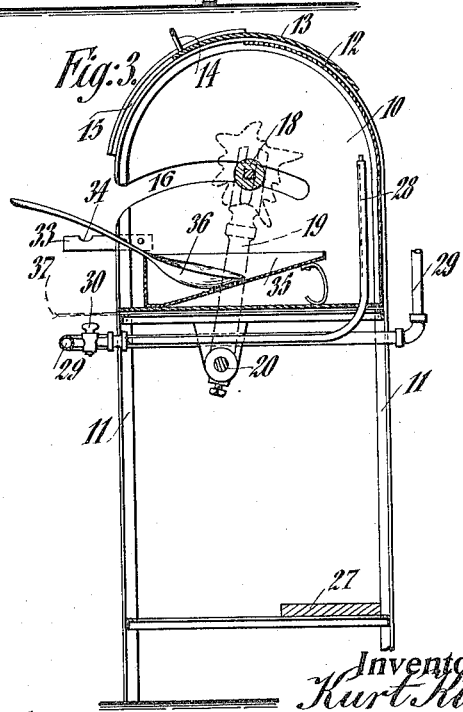
Attest:
Inventor:
Kurt Kluge
by
his Atty

UNITED STATES PATENT OFFICE.

KURT KLUGE, OF NEW YORK, N. Y.

BAKING-MACHINE.

1,152,184.  Specification of Letters Patent.  Patented Aug. 31, 1915.

Application filed May 8, 1915. Serial No. 26,688.

*To all whom it may concern:*

Be it known that I, KURT KLUGE, a subject of the German Empire, and resident of the borough of Manhattan, city, county, and State of New York, have invented certain new and useful Improvements in Baking-Machines, of which the following is a specification.

This invention relates to improvements in and relating to a baking machine, and particularly such a machine for baking cakes formed in a series of superposed cylindrical layers, the said layers being cooked successively from the innermost layer to the outermost layer.

To this purpose, the invention consists of a continuously rotating tapering roller on which the dough is placed during rotation of the roller, baked by means of a series of gas jets arranged behind the roller, and after the baking operation is completed, another layer is placed over the baked layer and the second layer is baked, and so on, until the cake attains the desired size. As the cake increases in size, the centrifugal force exerted on the outer layers causes the same to take a somewhat irregular shape, so that the cross-section of the finished cake resembles somewhat the cross-section of a tree, the various layers of the cake corresponding to the age rings of the tree.

An object of the invention is to provide such a device which may be easily manipulated, by which the cooking operation may be carried on in a rapid and effective manner, and in which the amount of heat may be regulated as desired.

A further object is to provide such a device which may be easily kept clean, and which will be simple in construction and inexpensive to manufacture.

With these and other objects in view, my invention comprises the novel features, arrangement and combination of parts, hereinafter more fully described and particularly pointed out in the claims.

In the drawings, Figure 1 is a front elevational view of my improved baking machine; Fig. 2 is an end view thereof; and Fig. 3 is a vertical section thereof, showing in dotted lines the form of the cake on the tapering roller.

Similar reference characters indicate corresponding parts throughout the several views of the drawings.

Referring to the drawings, and more particularly to Fig. 1 thereof, my invention comprises an oven 10 supported on legs 11 formed of angle-iron or the like, the said oven being open at the front, and having its top 12 in the shape of a hood, and open at the forward portion thereof. A sliding cover 13 having a handle 14 is provided on the said top and adapted to move in guideways 15 to cover and uncover the forward portion of the top. Each side of the said oven is provided with arcuate slots 16, in which the ends of a shaft 17 are disposed, on which the tapering roller 18 is mounted. The ends of the said shaft outside of the arcuate slots are supported on members 19, which are pivoted below the bed of the oven to the ends of the shaft 20. A wheel 21 is provided on the end of the shaft 17, having a peripheral groove therein, and a wheel 22 is provided on the end of the shaft 20 having a peripheral groove therein, the said wheel 22 being connected to the wheel 20 by means of a cross-belt 23 extending around a pinion 24 on the said wheel 20. The wheel 20 is connected by means of a belt 25 to an electric motor 26, or other suitable source of power, said motor being mounted beneath the bed of the oven on a support 27. A plurality of perforated gas pipes 28 are vertically arranged behind the tapering roller 18, and extend horizontally beneath the oven to the forward part of the same, where they are connected to a feed pipe 29 and are separately controlled by means of spigots 30. The roller 18 may be adjusted with respect to the said gas pipes by means of a toothed arcuate handle 31 engaging a lever 32 arranged on the support 19, the said lever being adapted to hold the said support and the tapering roller carried thereby at any position desired in front of the said gas pipes. A support 33 provided with a notch 34 is provided in front of the arcuate slots at each side of the said oven, for supporting the roller outside of the oven. A pan 35, having its greater depth at its forward end, and continuing to a point at the rear, is provided within the oven for holding the dough, and a spoon 36 is provided therein for placing the said dough on the roller. A slidable support 37 is provided beneath the bed of the oven, which may be drawn out, when desired, for supporting suitable receptacles for icing the cake and so forth.

The operation of my improved baking apparatus is as follows:—A piece of paper is first placed on the roller to enable the cake to be readily removed when baked, and the tapering roller is caused to be rotated by means of the motor 26. The dough is taken up by the spoon from the pan provided in the oven, and is placed on the revolving roller, thereby forming a ring of dough thereon, which is then allowed to cook by bringing the roller into the proper position with relation to the gas jets 28, it being obvious that as the size of the cake increases, the roller will not be so near the jets as at the beginning of the baking operation. As the rings forming the first layer are baked, other layers are placed thereon, which are successively baked until the cake attains the desired thickness. Because of the centrifugal force exerted on the dough, which force is greater as the size of the cake increases, the same takes on an irregular shape, shown in dotted lines in Fig. 3, which irregularity increases as the size of the cake increases. It will be seen that by regulating the speed of rotation of the tapering roller, this irregularity can be controlled as desired. When the cake is completed, the roller is removed from the oven, and the cake is slid therefrom and exhibited in its finished form, then closely resembling a tree. It may then be cut into slices, and the said slices, as above stated, resemble in appearance the cross-section of a tree.

It will be seen that with my improved device, a very convenient means is provided for cooking this particular form of cake, the device being of such construction as to be readily set up in summer resorts or other such places, where these products may be sold, and also forms a very useful adjunct to bakers, confectioners, and the like.

I have illustrated a preferred and satisfactory form of my invention, but it is obvious that changes may be made therein within the spirit and scope thereof, as defined in the appended claims.

I claim:—

1. A baking machine of the character described, comprising vertically disposed cooking means, a rotating roll in front of said cooking means adapted to receive the dough to be baked, and pivoted means adapted to support the said roll and to regulate the position of the same with respect to the said cooking means.

2. A baking machine of the character described, comprising an open front oven, vertically disposed cooking means therein, a tapering roll in front of said cooking means adapted to receive the dough to be baked, a shaft supporting the said tapering roll, pivoted means supporting the said shaft and adapted to regulate the position of the same with respect to the said cooking means, and means on said shaft for rotating the said roll.

3. A baking machine of the character described, comprising an open front oven having opposed arcuate slots in the sides thereof, vertically disposed cooking means in said oven, a shaft having its ends disposed in said slots, a tapering roll on said shaft, pivoted means supporting the said shaft and adapted to regulate the position of the said roll with respect to the said cooking means, means on the said shaft for rotating the roll, and means for placing dough on the said roll in successive superposed rings.

In testimony that I claim the foregoing as my invention, I have signed my name in presence of two subscribing witnesses.

KURT KLUGE.

Witnesses:
F. HOGG,
D. LEWIS MATTEN.

Copies of this patent may be obtained for five cents each, by addressing the "Commissioner of Patents, Washington, D. C."